2 Sheets—Sheet 1.
T. D. McCORMICK.
CORN-HARVESTERS.
No. 195,625. Patented Sept. 25, 1877.
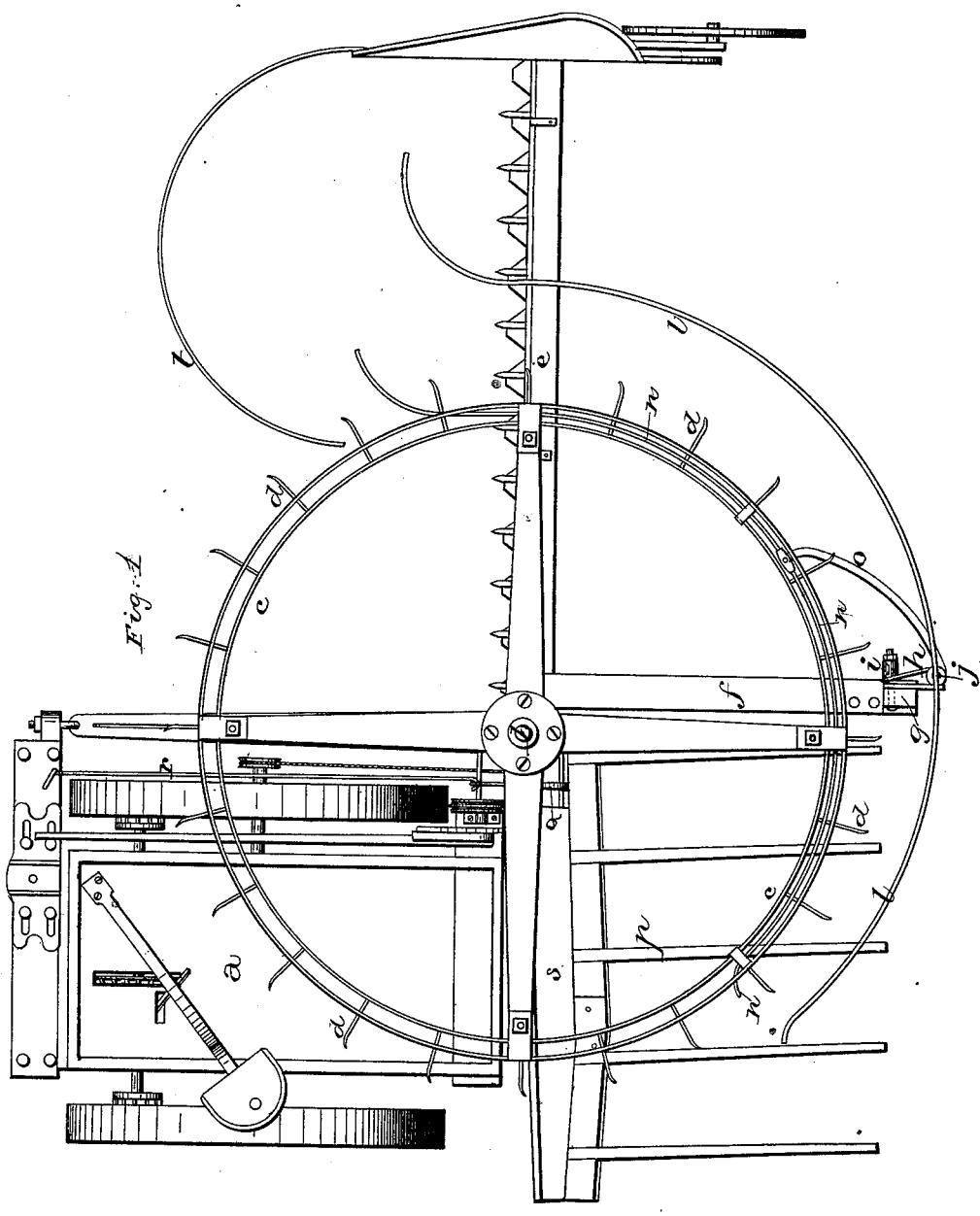
WITNESSES.
J. Wm Garner
Will H Kern.
INVENTOR
Thos. D. McCormick
per
F. A. Lehmann, Atty T. D. McCORMICK.
CORN-HARVESTERS.
No. 195,625. Patented Sept. 25, 1877.
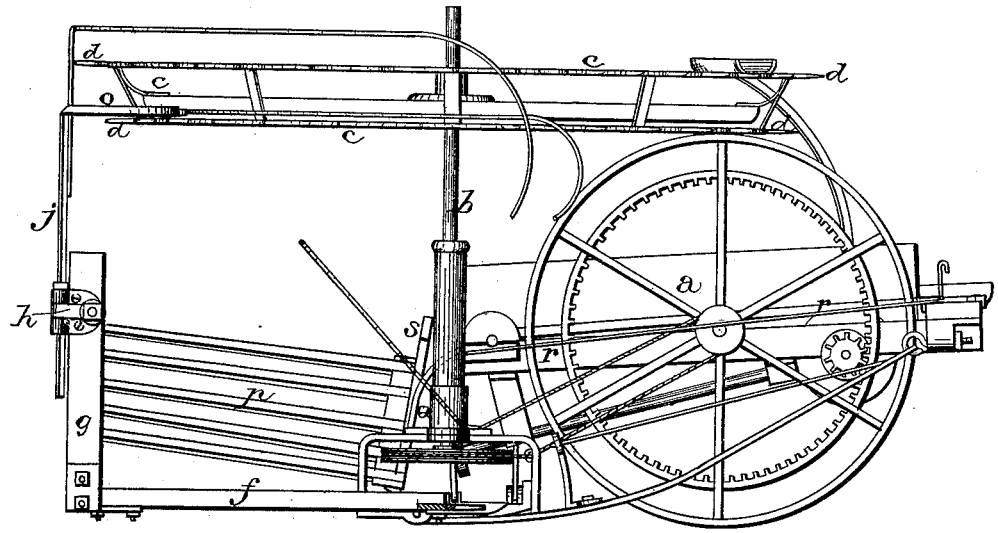
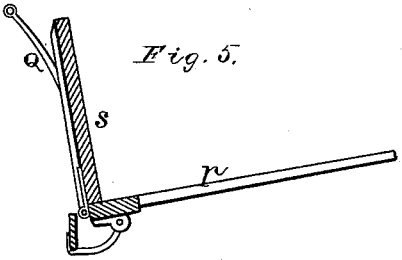
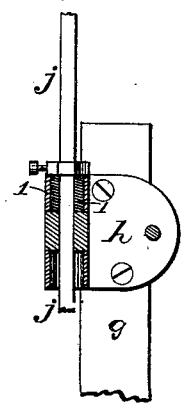
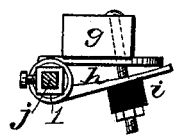
WITNESSES
J. Wm Garner
Will H. Kern
INVENTOR.
Thos. D. McCormick
per
J. A. Lehmann, Atty.

UNITED STATES PATENT OFFICE.

THOMAS D. McCORMICK, OF MASSILLON, OHIO.

IMPROVEMENT IN CORN-HARVESTERS.

Specification forming part of Letters Patent No. 195,625, dated September 25, 1877; application filed September 5, 1877.

*To all whom it may concern:*

Be it known that I, THOS. D. MCCORMICK, of Massillon, in the county of Stark and State of Ohio, have invented certain new and useful Improvements in Corn-Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in corn-harvesters; and it consists in the arrangement and combination of parts that will be more fully described hereinafter, whereby the corn-stalks are cut, carried around by the reel, and deposited upon a hinged platform, from which they can be thrown whenever desired by the driver.

Figure 1 is a plan view of my invention; Fig. 2, a side elevation. Figs. 3 and 4 are detail views of the hinge, and Fig. 5 a section of the platform and its back.

*a* represents a harvester or mowing-machine, of any desired construction, so that it is provided with a rake-shaft, *b*, upon the top of which is placed my vertically-adjustable reel *c*. When it is desired to make the machine as light as possible, as here shown, the cams for operating the rakes are all removed, and the reel is secured to the shaft *b* by means of a set-screw. This reel consists of two rings of unequal size, the larger one of which is placed above, and each of them are provided with a suitable number of short arms, *d*, all of which are slightly bent, as shown.

Extending straight back from the inner end of the finger-bar *e*, in a line with the draft of the machine, is the bar *f*, to the rear end of which bar is secured the vertical post *g*. To the upper outside of this post *g* is secured the hinge *h*, through the two leaves of which pass a rod, screw, or bolt, and on the outer end of this rod is fastened a rubber or other suitable spring, *i*, which presses against the outer side of the movable leaf, so as to hold it closed. The outer end of this movable leaf has a square hole made through it, so as to receive the square rod *j*, and in the upper end of the stationary leaf is placed a false box, 1, which steadies the rod in position. This rod *j* is made vertically adjustable by means of a set-screw, and has the two curved guards *l n* secured to it, which correspond in height to the two rings of the reel. The lower guard *n* is pivoted to the outer end of the arm *o*, and has a slight horizontal motion at each end.

To the rear side of the machine *a* is the hinged platform *p*, upon which the stalks are deposited after they are released from the reel. The hinges of this platform are so formed that the platform tilts slightly backward, and thus supports the load upon it, without causing such a strain upon the driver's foot. Projecting upward from this platform is the lever *q*, to which is fastened the connecting-rod *r*, which extends forward for the driver to hold with his foot. Whenever a sufficient load of stalks has fallen upon the platform the driver can discharge them in a bundle upon the ground. The back *s* is hinged directly to the inner edge of the platform, and serves to prevent the stalks from falling off from the front of the platform. By hinging the platform and the back together the stalks are prevented from falling in between the two, and thus preventing the platform from acting freely.

The operation of my machine is as follows: The guides *l n t* and the reel *c* guide the upper ends of the stalks, and draw them in the proper position for the reel to get a hold upon them by the time the cutter-bar cuts them off. The reel then carries the cut-off stalks around, holding them in a vertical position, until they reach the platform, against which they strike with their lower ends. By thus having their lower ends held back while their upper ends are carried forward the stalks are deposited evenly upon the platform, from which they are discharged by the driver, whenever he wishes it, through the means of the lever *q* and rod *r*. As both the reel *c* and the guards *l n* are vertically adjustable, they can be adjusted to suit all sizes of corn. By means of the spring and the joint in the lower guard, the guard can give, and adjust itself to an unusually large number of stalks passing through between the reel and the guard. In order to have the stalks pass through in a vertical position and keep straight, it is necessary to incline them somewhat, or the weight of the ears will draw them over to one side and out of position. For this reason the reel is formed of two rings, the lower one of which is the smaller. By having the reel-teeth slightly bent, they are prevented from sticking in the ears of corn, which they will do when they are straight. Where the guard-post is placed upon the top of the finger-bar the vibrations and twisting movements are such that the guards are apt to spring away from the reel, and thus let the stalks fall through to the ground. When the post $g$ is placed upon the top of the bar $f$, in the rear of the finger-bar, all this twisting is prevented, and the guards stay in close contact to the reel, no matter how rough the ground may be.

Having thus described my invention I claim—

1. The reel $c$, made of two separate rings, one larger than the other, and superposed to it, in combination with the two guards $l$ $n$, arranged as described, whereby the stalks are passed through in an inclined position, substantially as shown.

2. The combination of the reel $c$, the two guards $l$ $n$, arranged in relation thereto, as shown, vertically-adjustable rod $j$, and a spring-hinge, $h$, whereby the guards can adjust themselves to a large or a small number of stalks passing through, substantially as set forth.

3. The combination of the hinge $h$, spring $i$, and rod $j$, the rod having one of the wings fastened to it in such a manner as to open the hinge when it turns partly around, substantially as shown.

4. The post $g$ for supporting the guards, in combination with the bar $f$, which projects to the rear of the finger-bar, substantially as described.

In testimony that I claim the foregoing I have hereunto set my hand this 5th day of September, 1877.

THOMAS D. McCORMICK.

Witnesses:
WILLIAM FITCH,
W. H. KEEN.